MAGNETO-OPTIC READOUT FOR MAGNETIC DATA STORAGE DEVICE

Filed May 26, 1961 4 Sheets-Sheet 1

INVENTORS
ROBERT C. KELNER
HARRISON W. FULLER
BY
Philip J. McFarland
ATTORNEY

MAGNETO-OPTIC READOUT FOR MAGNETIC DATA STORAGE DEVICE

Filed May 26, 1961 4 Sheets-Sheet 2

INVENTORS
ROBERT C. KELNER
HARRISON W. FULLER
BY
Philip J. McFarland
ATTORNEY

MAGNETO-OPTIC READOUT FOR MAGNETIC DATA STORAGE DEVICE

Filed May 26, 1961 4 Sheets-Sheet 3

INVENTORS
ROBERT C. KELNER
HARRISON W. FULLER
BY
Philip J McFarland
ATTORNEY

MAGNETO-OPTIC READOUT FOR MAGNETIC DATA STORAGE DEVICE

Filed May 26, 1961 4 Sheets-Sheet 4

INVENTORS
ROBERT C. KELNER
HARRISON W. FULLER

BY Philip J. McFarland
ATTORNEY 3,167,751
Patented Jan. 26, 1965

3,167,751
MAGNETO-OPTIC READOUT FOR MAGNETIC DATA STORAGE DEVICE

Robert C. Kelner, Concord, and Harrison W. Fuller, Needham Heights, Mass., assignors to Laboratory for Electronics, Inc., Boston, Mass., a corporation of Delaware Filed May 26, 1961, Ser. No. 112,942
2 Claims. (Cl. 340—174.1)

The present invention relates in general to new and improved apparatus and methods for processing data and in particular to apparatus and methods for reading out data stored in a magnetic storage medium at a high density.

As described in a co-pending application by Harrison W. Fuller, Serial No. 697,058, filed November 18, 1957, now U.S. Patent No. 3,140,471 data may be stored at high density in a magnetic storage medium in the form of domains of opposite magnetization. As clearly described in the cited application and meant herein, a domain is a region of a magnetic medium in which the magnetization vectors are substantially aligned. A domain is separated from another domain of substantially opposite direction of magnetization by an interdomain wall in which the magnetization vectors are substantially normal to those in the domains. When the magnetization vectors of the interdomain walls are in the plane of the medium, the interdomain walls are termed Néel walls; when normal to the plane of the medium, they are termed Bloch walls.

As further described in the aforesaid copending application data readout is accomplished by scanning a storage medium with the magnetic field associated with an interdomain wall propagated in a scanning medium adjacent the storage medium. The magnitude of the scanning field is governed so that it is unable to reorient the direction of magnetization of the domains in the storage medium. The modulation of the velocity of propagation of the scanning wall caused by oppositely oriented domains in the storage medium is detected to provide a signal indicative of the data stored. Experience has proven, however, that when the width of oppositely oriented domains of the storage medium is extremely small, i.e. when the storage density is high, the amount of signal energy generated in scanning each domain may be minute. Consequently, the modulation of the velocity of the scanning wall may be too small to be detected with a sufficiently high degree of reliability.

The invention which forms the subject matter of this application uses the fluctuations in the intensity of polarized radiation, whose angle of polarization has been given a rotational increment by the Kerr or Faraday magneto-optic effect, to provide an indication of the data stored in a magnetic storage medium. Since the intensity of the polarized radiation may be set at any arbitrary level, the fluctuations in the intensity of the radiation caused by each individual domain may be made of a sufficiently large magnitude to provide a reliable signal.

Accordingly, it is a primary object of the present invention to provide techniques for reading out data reliably from high-density magnetic data storage devices.

It is another object of this invention to provide apparatus for reading out data reliably from high-density data storage devices by the use of magneto-optic effects.

It is a further object of this invention to provide apparatus for reading data out of a high-density storage medium wherein an interdomain wall propagated in a scanning medium modulates the angle of polarization of radiation emerging from the scanning medium and the storage medium.

In the present invention, a beam of polarized radiation is directed onto a storage medium and a scanning medium. The beam is then reflected or transmitted and the angle of polarization of a portion of it receives a rotational increment. The beam then passes through an analyzer and is subsequently focused upon a photocell. When an interdomain wall is propagated in the scanning medium the intensity of a portion of the beam with a preselected angle of polarization is seen to fluctuate in a manner corresponding to the direction of magnetization and width of the particular storage domain being scanned by the interdomain wall. These fluctuations thus provide a reliable indication of the data stored in the storage medium.

These and other novel features of the invention together with further objects and advantages thereof will become apparent from the following detailed specification with reference to the accompanying drawings in which:

FIG. 1 schematically represents a preferred embodiment of apparatus according to the present invention utilizing the Faraday magneto-optic effect.

Figures 4A, 4B, 5:
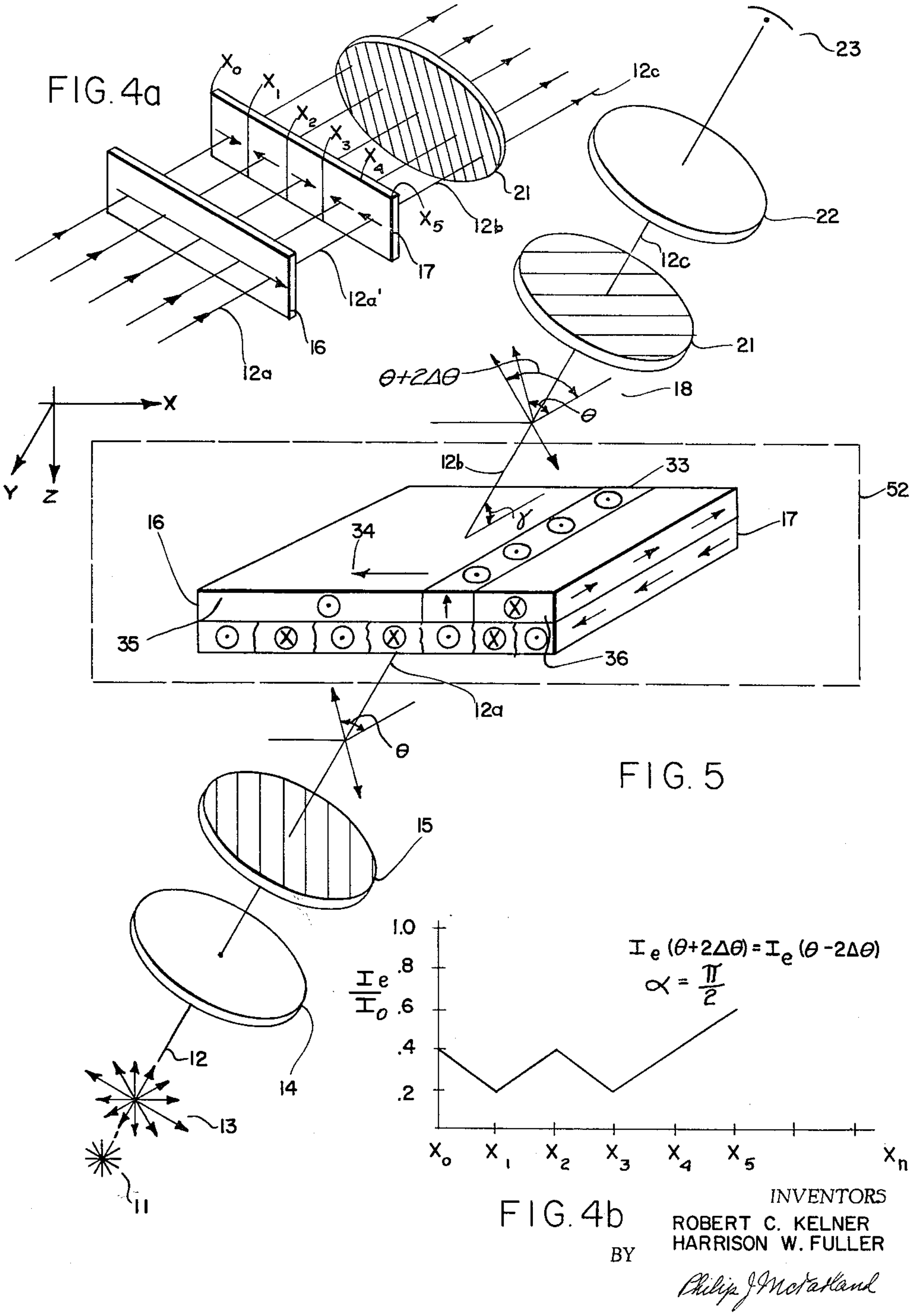

FIGS. 4*a* and 4*b* illustrate graphically a method of varying the intensity of radiation with a particular angle of polarization emerging from an analyzer as an interdomain wall scans a storage medium.

Figure 3:
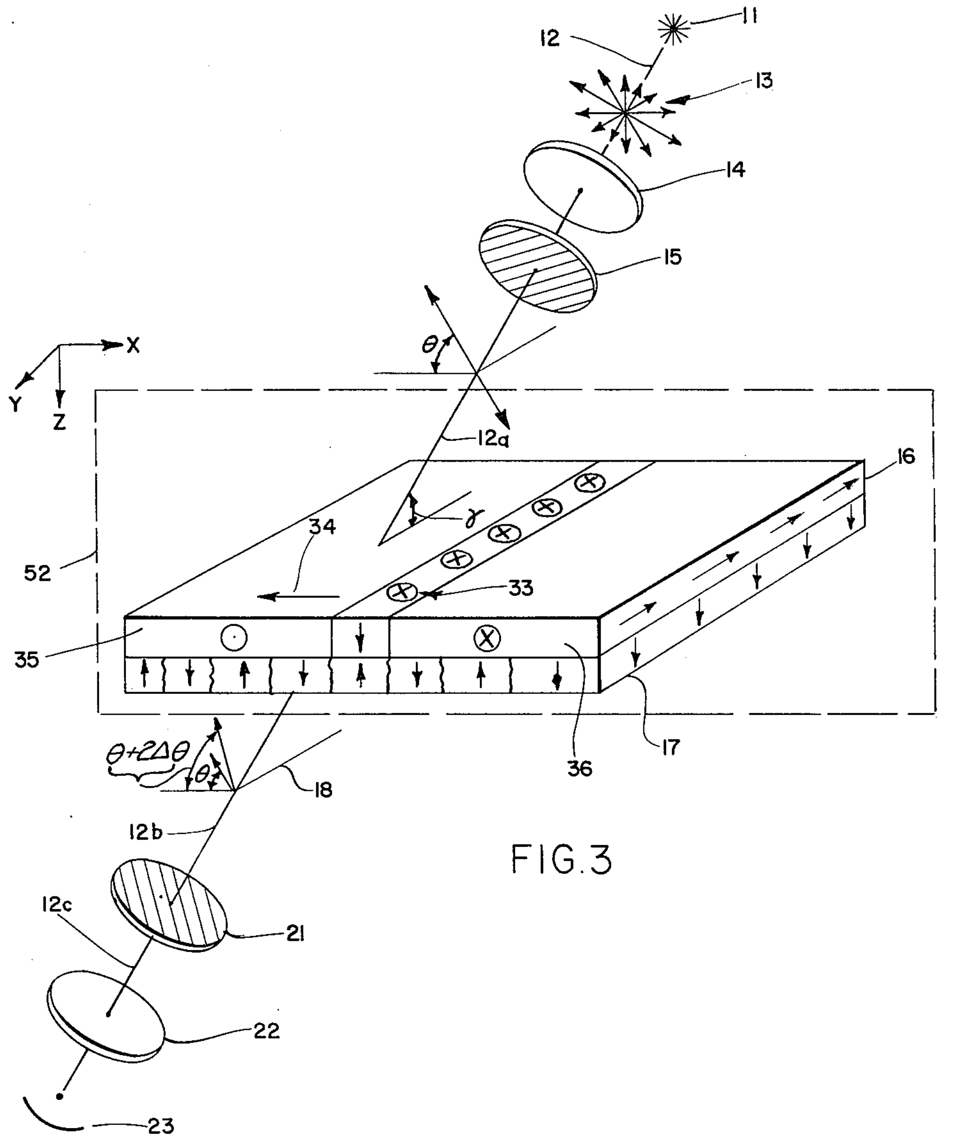
FIG. 3 illustrates apparatus for reading data out of a storage medium using the Faraday effect by means of an interdomain wall propagating in a scanning medium where the easy direction of magnetization of the scanning medium is perpendicular to that of the storage medium.

FIG. 5 illustrates a modification of the apparatus of FIG. 3 where the easy direction of magnetization of the scanning medium is parallel to that of the storage medium.

Figure 6:
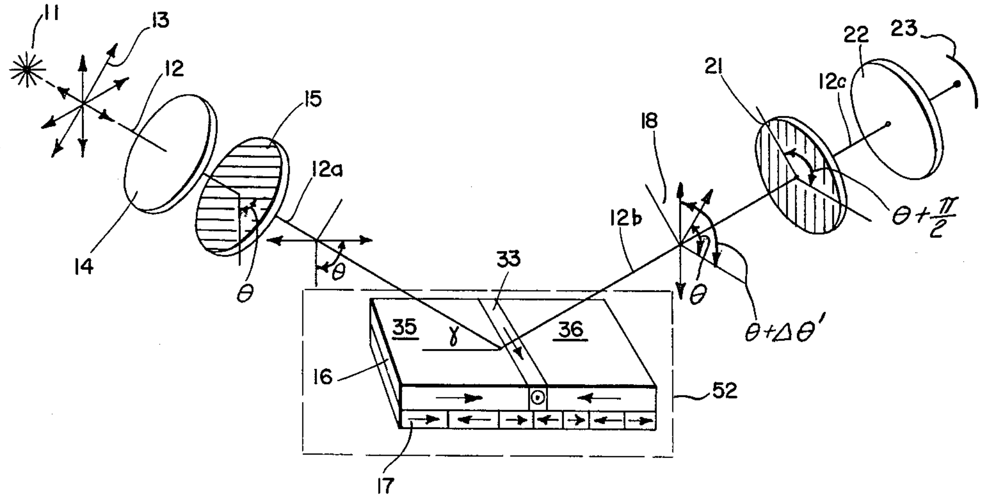

FIG. 6 illustrates schematically an embodiment of apparatus according to the present invention utilizing the Kerr magneto-optic effect.

Figure 7:
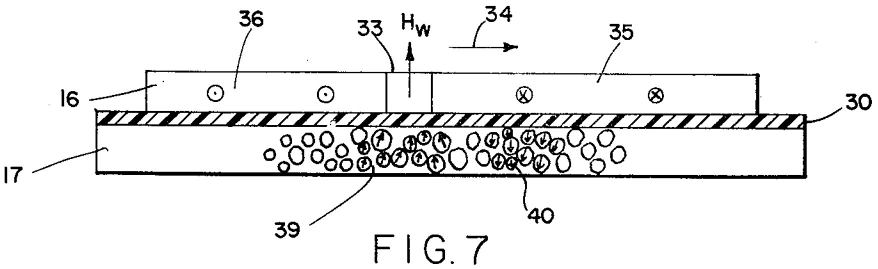

FIG. 7 illustrates a scanning medium and a multidomain storage medium consisting of domains of different directions of magnetization.

Figure 8:
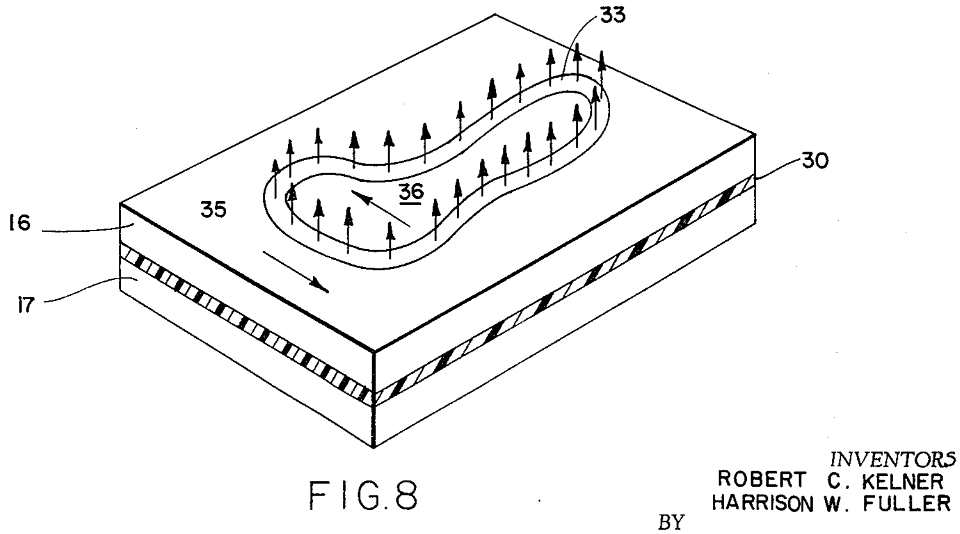

FIG. 8 illustrates a storage medium and a scanning medium wherein random domains are generated from nuclei of reproducible interdomain walls.

In the following description, the source of electro magnetic radiation will be taken to be visible light and the beam of light will be considered to be plane-polarized. It is to be understood that these limitations are imposed only for purposes of illustration. For example, the spectrum of usable radiation is, as presently known, unlimited. It should also be understood that, for ease of explanation of the present invention, the fingers and the written description thereof have been simplified. For example, the construction and the structural relationship between and the means for establishing a propagating interdomain walls in the scanning medium and the storage medium are shown in detail in the cited application of Fuller.

Figure 1:
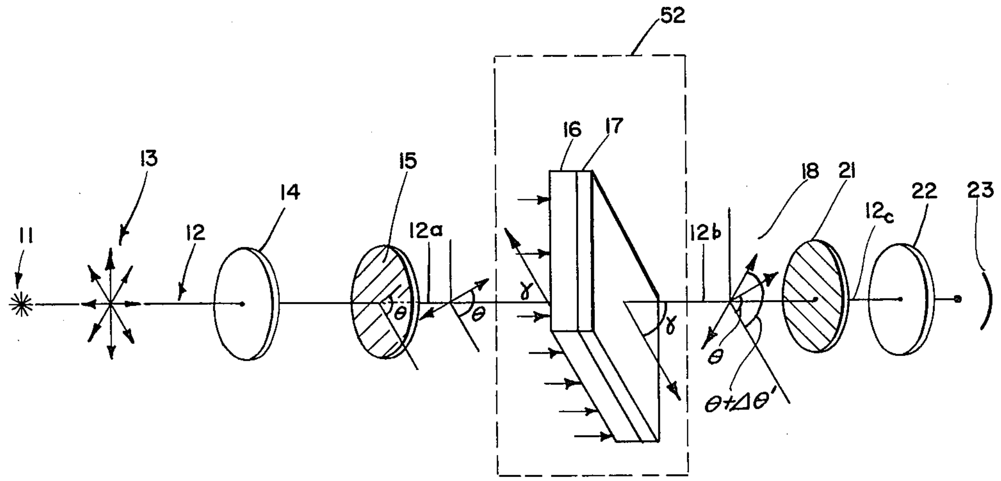

With reference now to FIG. 1, a light source 11 produces a beam 12 having vector components of polarization in all directions as shown at 13. The beam 12 passes through a light collimating lens system 14 and a polarizing device 15 having a polarizing angle, as the angle $\theta$. The beam 12*a* emerging from the polarizing device 15, therefore, has an angle of plane-polarization $\theta$. Beam 12*a* impinges on a data storage system 52 which includes, in the embodiment shown, a scanning medium 16 disposed in close association with a storage medium 17. Both the scanning medium 16 and the storage medium 17 are positioned at an angle $\gamma$ to the beam 12*a*. As indicated by the plurality of arrows adjacent the scanning medium 16 in FIG. 1, the entire areas of both the scanning medium 16 and storage medium 17 are illuminated by the beam 12*a*. If the storage medium 17 and the scanning medium 16 have their magnetization vectors oriented according to their respective easy directions of magnetization aligned by apparatus 53 as described in detail in the prior cited application, the angle of polarization of the polarized beam 12*a* upon traversing the scanning medium 16 and the storage medium 17 is rotated. The latter condition is generally indicated at 18, wherein it may be seen that beam 12*a* has been changed to the beam 12*b* having an angle of polarization $\theta \pm \Delta\theta'$, where $\Delta\theta'$ is the total rotational increment imparted to the angle of polarization of the beam 12*a* by the scanning medium 16 and the storage medium 17. An analyzing device 21, having a preselected angle of polarization, transmits a fraction of the polarized light 12*b* to form beam 12*c*, the intensity of beam 12*c* being a function of the angle between angle of polarization of the beam 12*b* and the angle of polarization of analyzer 21. A condensing lens system 22 focuses the beam 12*c* on a photoelectric cell 23 which, in turn, responds to variations in light intensity to produce a varying output signal.

According to the well-known Faraday magneto-optic effect, the rotational increment imparted to the angle of polarization of a polarized beam by a magnetic medium may be calculated by the use of the following equation:

$$\Delta\theta = T \times K \times \cos\phi$$

where $\Delta\theta$=rotational increment imparted to the angle of polarization of a polarized beam traversing a magnetic medium, $T$=thickness of the medium along the beam path, $K$=specific rotation of the medium per unit thickness, $\phi$=angle between the direction of propagation of the incoming beam and the direction of magnetization of the medium.

Figure 2:
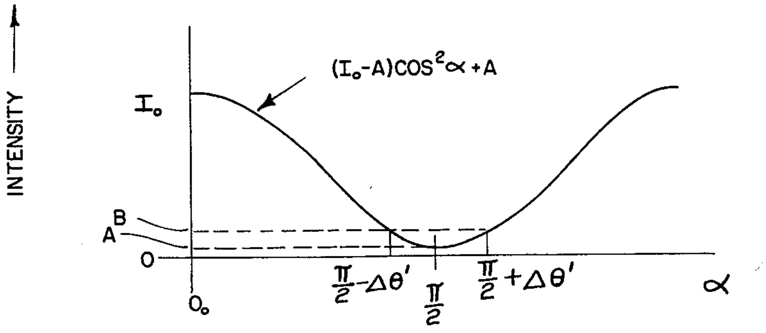
FIG. 2 illustrates the effect of an analyzing medium on the intensity of a polarized beam as a function of the angle between the angle of polarization of the beam and the polarizing angle of the analyzing medium.

FIG. 2 illustrates the intensity of the beam 12*c* emerging from the analyzer 21 and is seen to be a $\cos^2$ function of the angle $\alpha$, where $\alpha$ is the angle between the angle of polarization of the beam 12*c* incident on the analyzer 21 and the angle of polarization of the analyzer 21. The light intensity of the beam transmitted by the analyzer is seen to be smallest for $$\alpha = \frac{\pi}{2}$$

The residual intensity value "A" is due to imperfections in the analyzer; this residual intensity is low enough to be without practical significance. For example, in a practical device as illustrated in FIG. 1, intensity of beam 12*c* when the rotational increment is $\pm\Delta\theta'$ is shown at point B.

FIG. 3 illustrates in more detail the technique which constitutes the subject matter of the invention. The data storage system 52 is shown to include a storage medium 17 having an easy direction of magnetization parallel to the Z-axis and a scanning medium 16 having an easy direction of magnetization parallel to the Y-axis. For the purpose of reading out data stored in the form of oppositely oriented domains in storage medium 17, an interdomain wall 33 is formed at one edge of the scanning medium 16 and is propagated in a direction 34 parallel to the X-axis, in a manner explained in detail in the aforementioned copending application. The effect of the magnetic field generated in the scanning medium 16, or more specifically that associated with the traversing interdomain wall 33, is such that no reorientation of magnetic domains takes place in the storage medium 17. The propagation of the interdomain wall 33 across the scanning medium 17 changes the direction of magnetization of the scanning medium 16 from that indicated in portion 35 to that shown in portion 36. A polarized beam of light 12*a*, having an angle of polarization $\theta$ and parallel to a plane determined by the Y- and Z-axis, impinges on scanning medium 16 at an angle $\gamma$. In this embodiment it is understood that the entire scanning medium 16 is illuminated by the incident polarized beam 12*a*. Prior to the propagation of the interdomain wall 33, the polarized beam (designated as 12*a'* in FIG. 4*a*) emerging from the scanning medium 16 alone has a rotational increment of $\Delta\theta$, where for simplicity $\Delta\theta = \Delta\theta$ (scanning)$=\Delta\theta$ (storage). Since each domain of the storage medium 17 can contribute a rotational increment of $\pm\Delta\theta$, depending on its direction of magnetization, the emerging light beam 12*b* is composed of portions having an angle of polarization equal either to $\theta$ or $\theta+2\Delta\theta$. The analyzer 21 can be set so as to extinguish light with one of the two polarization angles, giving a reference level. As the interdomain wall 33 traverses the scanning medium 16, reversing the direction of magnetization of the latter and establishing regions 35 and 36, each magnetic domain in the storag medium 17 in succession receives polarized light with a rotational increment of $-\Delta\theta$, instead of $+\Delta\theta$. Consequently, the plane of polarization of the light emerging from each magnetic domain is changed by an amount $2\Delta\theta$ as compared to the plane of polarization of the light prior to the passage of the interdomain wall 33. The total light intensity emerging from the analyzer 21 will then be increased or decreased a finite amount as the interdomain wall 33 passes over each magnetic domain. This variation in light intensity then is sensed by the photocell 23 shown in FIG. 1 and causes the output signal of the latter to vary.

FIGS. 4*a* and 4*b* illustrate graphically a method of varying the intensity $I_e$ of beam 12*c* emerging from the analyzer 21. As shown, the scanning medium 16 is assumed to be initially magnetized in one direction while the storage medium 17 has four domains. A polarized beam 12*a*, having an intensity $I_0$, is directed onto the scanning medium 16. It is understood that the angle $\phi$ heretofore defined is less than 90°. As an interdomain wall (not shown) scans the storage medium 17 from left to right, the rotational increment given to the polarized beam 12*a* emerging from the scanning medium 16 and the polarized beam 12*b* emerging from each domain in the storage medium 17 changes by an amount $2\Delta\theta$. If the analyzer 21 is set so that $$\alpha = \frac{\pi}{2}$$

only light having a rotational increment of $\pm 2\Delta\theta$ may pass therethrough. The contribution to the total intensity $I_e$ of the beam 12*c* by each domain in the storage medium 17 is summed as the interdomain wall in the scanning medium scans across each position $X_n$ in the storage medium 17. The resultant intensity $I_e$ of the polarized beam 12*c* is shown graphically in FIG. 4*b*. It may be seen then that the direction of fluctuation of the light is determined by the relative direction of magnetization of each domain in the storage medium, while the amount of such fluctuation is determined by the relative width of each such domain.

The apparatus shown in FIG. 5 is similar to the embodiment of FIG. 3, applicable reference numerals having been retained, and illustrates the technique of magneto-optic data readout as applied to a data storage system 52 wherein the storage medium 17 has its easy direction of magnetization parallel to the Y-axis. Beam 12*a* is parallel to a plane defined by the Y- and Z-axis. As in the case of the embodiment illustrated in FIG. 3, the magnetic orientation of region 35 of the scanning medium 16 imparts a rotational increment to a portion of the passing polarized beam 12*a*, while region 36 imparts a rotational decrement. Similarly, a rotational increment or decrement is imparted by each individual magnetic domain of the storage medium 17 to a portion of the beam 12*a* passing through the individual domain, with the sense of the rotation depending on the orientation of the particular domain traversed by the portion of the beam 12*a*. The analyzer 21 is again adapted to extinguish light having a particular angle of rotation so that the intensity of the beam 12*c* passing the analyzer varies according to the direction of magnetization of the particular magnetic domain being scanned by the interdomain wall 33.

At this point it should be noted that the data storage system 52 also includes means for establishing and propagating an interdomain wall in a scanning medium and for reading information into a storage medium. However since such means do not comprise a part of the present invention, the various time-varying magnetic fields, and the non-magnetic conducting media and currents necessary to generate such fields are not shown, being fully described in the aforesaid copending application. It should also be noted that, if one is interested in readout only, none of the various storage mediums shown have to be placed within the field of an interdomain wall in a scanning medium. If one wishes to use the field of an interdomain wall for read-in, however, the storage medium and scanning medium have to be placed in close proximity. Care must then be taken that the field of the interdomain wall be made non-orienting with respect to the domain in the storage medium during readout.

The elements making up data storage system 52 (except for the supporting substrate) may be vacuum deposited to any desired thickness and hence can be made transparent to the polarized beam 12*a*. Any supporting substrate should be chosen also to be transparent.

As illustrated in FIG. 6, the rotational increment given polarized light by the Kerr magneto-optic effect could be used in a fashion similar to that employing the Faraday magneto-optic effect to read data out of a magnetic storage medium 17. In this embodiment the analyzer 21, focusing lens system 22, and photocell 23 are placed on the same side of the scanning medium 16 and the storage medium 17 as the light source 11, collimating lens system 14, and the polarizer 15, and at a position suitable to receive the reflected light 12*b*. The polarized light 12*a* passes into the scanning medium 16 and the storage medium 17, whence it may be reflected back out into the analyzer.

FIG. 7 illustrates a multidomain storage medium 17 consisting of domains of different directions of magnetization 39 and 40, as described in the aforementioned copending application. Here the degree of alignment of the magnetization vectors depends on the strength of the field $H_w$ of the interdomain wall 33 and could be representative of an analogue quantity. The intensity of the polarized light (either reflected or transmitted) with a particular angle of polarization will depend on the degree of alignment of the magnetization vectors and hence will also be representative of the stored analogue quantity.

In FIG. 8 the domains of the scanning medium 16 and the storage medium 17 are substantially those described in the aforementioned copending application i.e. random domains from reproducible interdomain walls which propagate out from or into randomly located nuclei on the application of a magnetic field to the scanning medium 16. In this configuration, the same scanning medium 16 that generated the domains in the storage medium 17 is used to scan the storage medium 17 during the readout operation.

In FIG. 7 and FIG. 8 the scanning medium 16 and the storage medium 17 are shown to be separated by an insulating medium 30 which medium 30 for example may consist of a layer of an electrically and/or magnetically non-conducting material.

It is apparent from the foregoing description that the invention described in this application is sensitive to fluctuations in the intensity of the radiation source; it is imperative then that that element be kept fairly constant in intensity for best results or that any fluctuations in intensity be detected and used to monitor the output of the photocell. Also, the whole structure should be shielded from stray radiation, and electric and magnetic fields, as by an appropriately shaped enclosure.

It is not necessary that the analyzer be set to extinguish radiation with one of the two resultant angles of polarization, provided the fluctuations appear on a constant or slowly varying output signal. Further, the rotational increments imparted to the polarized beams by the scanning medium and the storage medium usually will be unequal. Still further, the direction of magnetization of the scanning medium or the storage medium need not be restricted to planes parallel or normal to the surface of such media. It is not necessary for the operation of this device that the scanning medium or the storage medium have easy directions of magnetization.

Having thus described the invention, it will be apparent that numerous modifications and departures, as explained above, may now be made by those skilled in the art, all of which fall within the scope contemplated by the invention. Consequently, the invention herein disclosed is to be construed as limited only by the spirit and scope of the appended claims.

What is claimed is:

1. Data processing apparatus for producing a signal indicative of data stored in a magnetic storage medium in the form of a sequence of opposite oriented substantially parallel magnetic domains, comprising:

(*a*) a magnetic scanning medium disposed adjacent to the magnetic storage medium and having an easy direction of magnetization substantially parallel to the magnetic domains in such storage medium;

(*b*) means for applying a magnetic field to the magnetic scanning medium to propagate therein an interdomain wall successively overlying individual ones of the domains in the magnetic storage medium;

(*c*) means for illuminating the magnetic scanning medium and the magnetic storage medium with plane-polarized light directed at an acute angle to the surface of such mediums;

(*d*) means, including a photocell actuated by the plane-polarized light passing through the magnetic scanning medium and the magnetic storage medium, for producing a signal having a first amplitude when the magnetic field of the scanning medium is parallel with the magnetic field of a domain in the magnetic storage medium and having a second amplitude when such magnetic fields are anti-parallel.

2. Data processing apparatus as in claim 1 wherein the last-named means also includes an analyzer, the angle of polarization thereof being set at an angle, $90° \pm \theta°$, with respect to the plane of polarization of the plane-polarized light, where $\theta°$ equals the rotational increment imparted to the plane of polarization of such light by the magnetic field of the interdomain wall in the scanning medium.

References Cited in the file of this patent

Magnetic Domains by the Longitudinal Kerr Effect, by Fowler and Fryer; Physical Review, vol. 94, No. 1, Apr. 1, 1954.